Sept. 22, 1970     G. A. BUON     3,529,890
CAMERA MAGAZINE FOR HIGH FILM CAPACITY USING FREE-FLOATING
CORELESS SUPPLY ROLL OF FILM
Filed Nov. 22, 1965     3 Sheets-Sheet 1
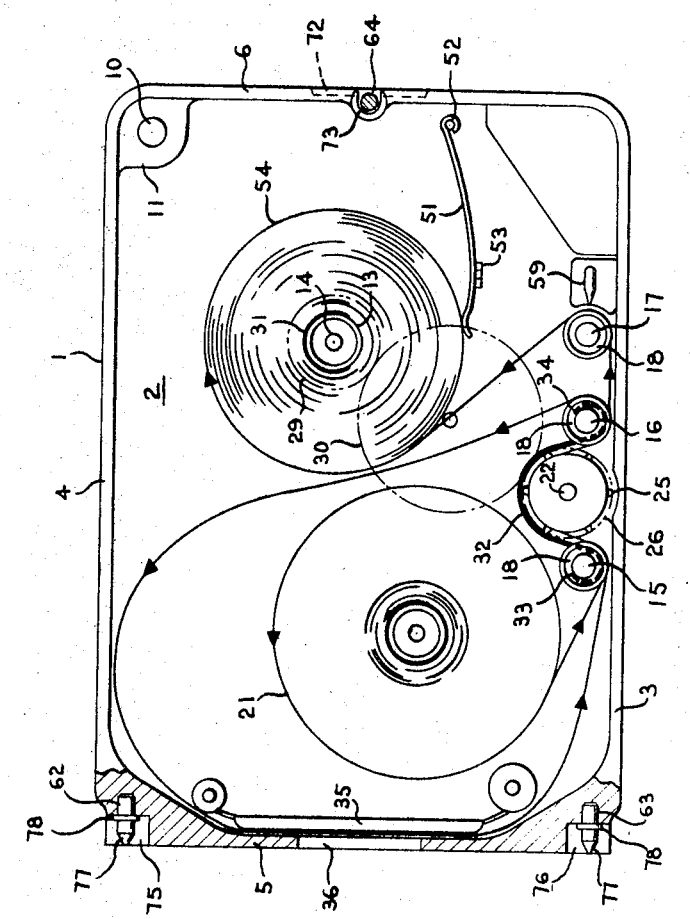
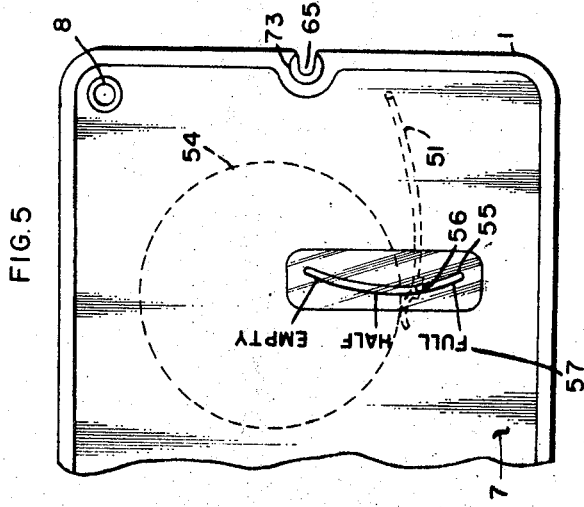
INVENTOR.
GEORGES A. BUON
BY
ATTORNEY

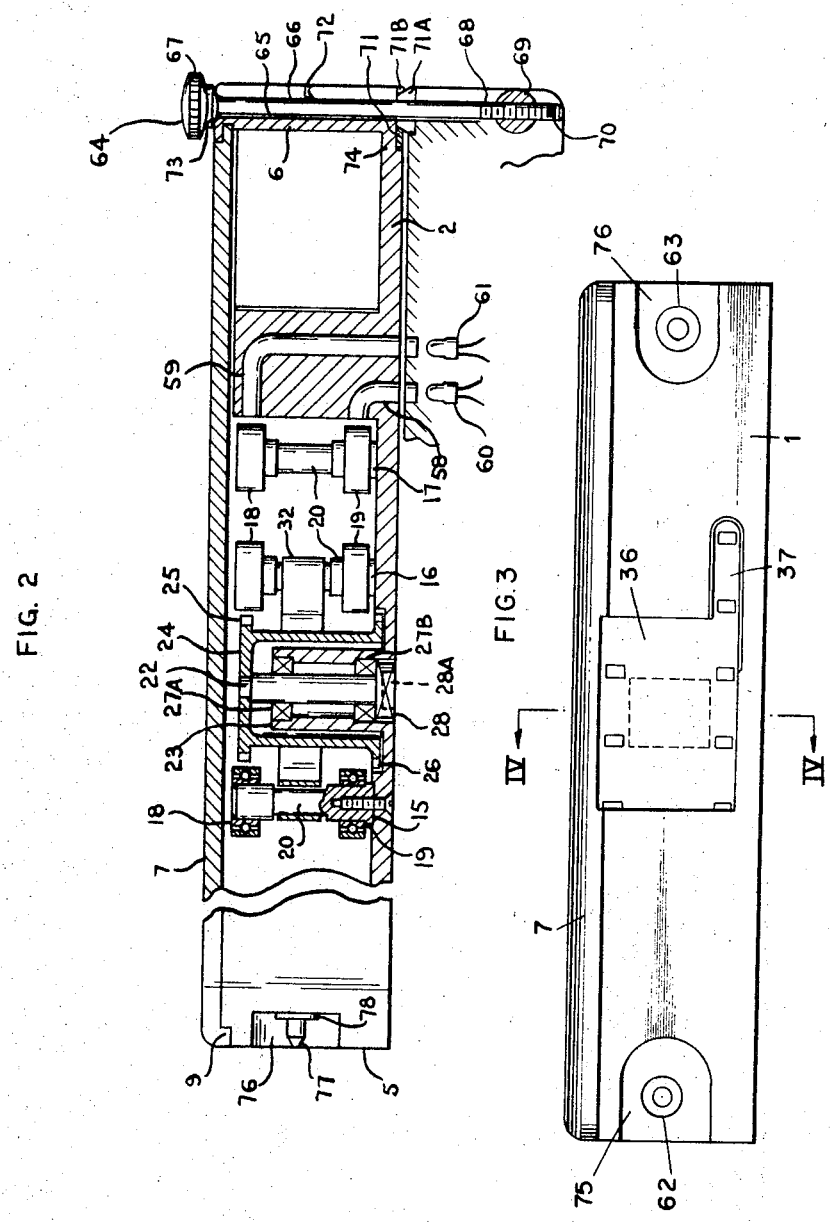

Sept. 22, 1970  G. A. BUON  3,529,890
CAMERA MAGAZINE FOR HIGH FILM CAPACITY USING FREE-FLOATING
CORELESS SUPPLY ROLL OF FILM
Filed Nov. 22, 1965  3 Sheets-Sheet 3

INVENTOR.
BY GEORGES A. BUON
ATTORNEY

United States Patent Office 3,529,890
Patented Sept. 22, 1970

3,529,890
CAMERA MAGAZINE FOR HIGH FILM CAPACITY USING FREE-FLOATING CORELESS SUPPLY ROLL OF FILM
Georges André Buon, Whitestone, N.Y., assignor to J. A. Maurer, Inc., Long Island City, N.Y., a corporation of New York
Filed Nov. 22, 1965, Ser. No. 508,997
Int. Cl. G03b 23/02
U.S. Cl. 352—78                             13 Claims

ABSTRACT OF THE DISCLOSURE

A camera magazine for supplying coreless rolls of film wherein film is threaded from a freely moving roll, over a first roller, a film sprocket, a second roller, between a film pressure plate and an objective aperture, over the first roller, the film sprocket, the second roller and a third roller to a film take-up spool. A film stripper having the ends thereof mounted on the first and second rollers is spaced from and extends around the inner circumferential portion of the film sprocket, preventing the freely moving film roll from contacting the sprocket teeth. A justifying spring engages the edge of the film to keep the film frames at the focal plane of the objective and the magazine is supported on the camera by a three-point suspension system free of any external projections to facilitate storage thereof.

---

The instant invention relates to magazines for supply rolls of photographic film for cameras, and particularly for rolls of film wound flat upon itself without a central core or spindle and floating free in its space chamber.

An object of the invention is to provide a film magazine for any type of camera, particularly motion picture cameras, within which magazine all portions of the film length in a flat roll, both when drawing film from the coreless supply roll and when winding it back, the film moves in the same direction and with the same velocity.

Another object is to provide a magazine for housing a supply roll of film of maximum length for the volume and dimensions of the magazine, such film length being higher than the supply film capacities of prior known magazines.

A further object is to provide a magazine for flat coreless supply rolls of film which, in the unwinding or rewinding movement of the film, involves no friction between such portions of the film which may be in contact with other portions of the supply film for any reason, and hence no film drag or scratches.

Still another object is to provide a film magazine for flat coreless rolls of photographic film in which the portion of the advancing film is compulsorily at the camera objective focal plane, no matter what the physical dimensional tolerances of the magazine dimensions may be.

A further object is to provide a film magazine which is rigidly supported on the camera body per se by a three-point suspension assuring solid location along the three Cartesian axes.

Another object is to provide a film footage indicator readily observable in the external planar surface of the removable magazine cover by the position of a movable metal ball in a recess of such surface along a footage scale associated with the recess.

A further object is to provide a light-tight film magazine of which all external surfaces are planar rectangular parallelepipeds without any external projections therefrom.

Another object is to provide photographic film magazines having maximum storage efficiency which, in addition, are readily and foolproofedly installed on camera bodies, and per se are facilely loaded with film.

The foregoing, and other, objects and features of my instant invention will be readily understood from the following description of an illustrative embodiment thereof when read in conjunction with the appended drawing wherein like reference characters in the various figures designate the same parts in the several views, in which:

FIG. 1 is a plan view of the illustrative embodiment with the cover removed;

FIG. 2 is a side view of FIG. 1 with adjacent portions of the camera body per se;

FIG. 3 is an end view of FIG. 1 from the objective apertured end wall of the magazine;

FIG. 5 is a plan view of the magazine cover.

Figure 4:
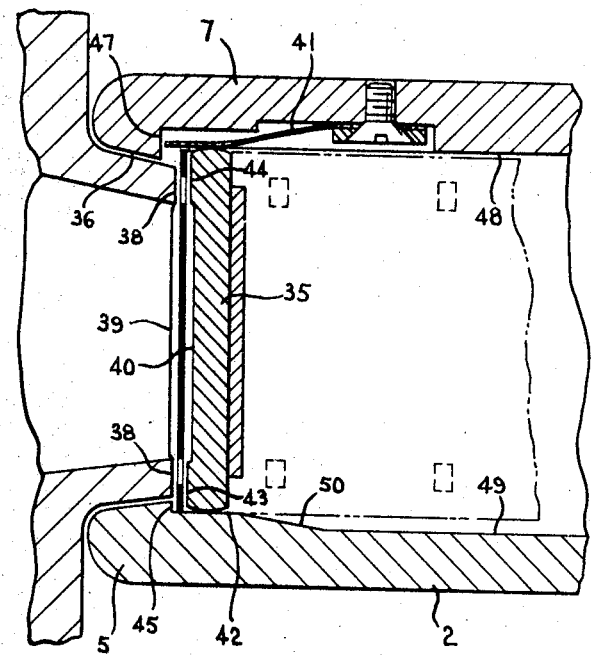
FIG. 4 is a section along line IV—IV of FIG. 3 on an enlarged scale.

Referring to the drawing, magazine housing 1, which may be a die or investment casting of any light rigid material such as metal, plastic, etc., has bottom 2 integral with side walls 3 and 4, and integral end walls 5 and 6, and is provided with a cover 7, preferably of the same material, slidable in guide channels in the upper faces of side walls 3 and 4 from the front end wall 5, the objective apertured wall, to rear end wall 6 for light-tight closure of the magazine. At its end region remote from objective apertured wall 5, cover 7 has an aperture 8 therethrough which receives a spring-pressed plunger 10, when the cover is fully in place with shoulder stop 9, extending from the end of the longer side of cover 7 abutting objective apertured wall 5, thereby providing a light-tight seal preventing accidental or intentional opening of a film-loaded magazine with its attendant spoilage of the unexposed film which would be light struck and fogged on such opening. Spring-biased plunger 10 is positioned in an internal wall boss 11 within the magazine, preferably at the junction of remote end wall 6 and side wall 4. Plunger 10 is so spring biased that normally its external face, which axially may be rounded off or of frusto-conical shape below the planar external surface of cover 7, and is of such diameter as to be slidingly fit in aperture 8 of which aperture the diameter is sufficiently small that the average human finger cannot be inserted, even endwise, thereinto. I prefer requiring a small-diametered rod for use to depress plunger 10 for opening the magazine, thereby completely avoiding accidental opening of a magazine loaded with unexposed film.

Within magazine housing 1 a film take-up core 13 is rotatably mounted on shaft 14 projecting inwardly from magazine bottom 2, and, in region between shaft 14 and magazine side wall 3, three additional stub shafts 15, 16 and 17 for example, are fixed in and extend inwardly from magazine bottom 2. Each of fixed shafts 15, 16 and 17, spaced from, but in alignment with, each other has affixed to its respective ends, by keys or other known means, the inner cylinder of a roller bearing, 18 and 19, leaving intermediate portion 20 of each shaft between these bearings free. The outer cylinders of bearings 18 and 19 are thus free to rotate and are of such diameter as to be rotated on passage of advancing film thereover in contact therewith at the respective lateral regions of the film. A coreless roll 21 of film is positionable flat on bottom 2 of the magazine, the film from roll 21 being threaded, inter alia, about the successive outer cylinders of roller bearings 18 and 19 on shafts 15, 16 and 17 as hereinafter described, ultimately to be wound on take-up core 13.

Between fixed shafts 15 and 16, a shaft 22 extends inwardly into magazine 1 within a hollow boss 23 extending from bottom 2, shaft 22 having affixed thereto at its inner (upper in FIG. 2) end a shell 24 with its inner (upper) end in the form of a sprocket 25 in longitudinal alignment with, but of larger diameter than, the outer cylinders of roller bearings 18. The other axial end of shell 24 is in the form of a flat thin gear 26 flush with the internal face of bottom 2. Ball bearing 27, consisting of an inner (upper) bearing 27A and a lower bearing 27B of which the outer cylinders are affixed to the surface of the stepped bore through boss 23, rotatably supports shaft 22 of which the inner face of its lower enlarged region 28 is coplanar with the inner face of bottom 2 and so maintained by the axially adjacent face of bearing 27B; bearings 27A and 27B in turn being maintained longitudinally axial of boss 23 by the shoulders of the stepped bore through the boss. Enlarged end region 28 of shaft 22 is provided with any known coupling means for engagement with a drive means extending from the camera body per se, for example a squared aperture 28A axially in the end of shaft 22 for receiving the squared end of such common drive means, the outwardly facing surface of enlarged end region 28 of shaft 22 being not quite at the outer face of magazine bottom 2 or, at most, flush therewith.

As has been stated, take-up core 13 is rotatably mounted on fixed shaft 14, the latter being somewhat displaced from the longitudinal axis of magazine 1, at about one-fourth the length of such axis from end wall 6, giving maximum diameter possibility to the take-up roll of film windable on core 13. Core 13, at its end adjacent to magazine bottom 2, carries a flat gear 29 concentric with the core and adapted, on positioning the core on fixed shaft 14, to mesh with a flat idler gear 30 for coupling gear 29 to gear 26 of shell 24 so that the take-up core is rotated with, and in the same direction as, sprocket 25. In the embodiment, gears 26, 29 and 30 are positioned as closely adjacent as practical to the inner face of magazine bottom 2, preferably flush therewith in appropriate recesses in such inner face. The clearances between the peripheries of gears 26, 30 and 29 and the recesses in which the gears are sunk are held to a minimum thus forestalling any possibility that edge portions of the film could enter thereinto and deflect the film from the intended feed path. About the cylindrical surface of take-up core 13 a flat, open circular spring 31 is removably sprung, between which and such cylindrical surface the leading end of the film drawn from coreless supply roll 21 may be clamped, by removing and replacing spring 31, to coil the exposed film portion by winding it up about core 13.

About and spaced from the circumferential half of sprocket 25 extending inwardly into the magazine interior, a stripper 32 of about one-third to one-half the axial length of sleeve 24 and of highly polished hardened metal of revolute shape is anchored by its semicircular ends 33 and 34 to intermediate regions 20 of shafts 15 and 16, respectively. It will be noted that no other region of supply film roll 21 within the magazine than the film region inserted, and fed at any time, between stripper 32 and sprocket 25, with the film sprocket perforations engaging the teeth of the sprocket, can contact any sprocket teeth, which contact might in all likelihood damage the film and the recording thereon, and interfere with the film feed.

At the interior objective end region of the magazine a back pressure plate 35 of spring steel is biased by its springiness, in well known manner, towards an objective aperture 36 to position film at the front face of plate 35 toward end face 38 of the objective lens tube of the camera. Portion 39 of lens tube face 38 which does not register with the sprocket hole regions of the film fed between it and plate 35 is somewhat recessed from the remainder of face 38, as clearly shown in FIG. 4; that is, the film frames for recording pictures do not contact the end face of the camera lens tube. Similarly, portion 40 of the front face of pressure plate 35 is recessed, and the entire front face of the pressure plate is slightly spaced from the passing film, the picture recording, visual image portion thereof somewhat more than the sprocket hole or perforation regions thereof and readily assuring that by such arrangement the picture recording portion is at, and can be adjusted to be at, the focal plane of the camera lens objective, and exactly so. As best seen in FIG. 3, objective aperture 36 has an elongated slot 37 connecting with an edge thereof, which slot is of adequate length and width as not in any manner to impede the movement of the tooth of the usual film advancing claw, not shown in the drawing because well known in the art, which claw tooth will extend from the camera body per se into a perforation of the film positioned at the slot and be moved to advance the film one frame when taking pictures with the camera. As is known, the springiness of the back pressure plate is such that when the magazine is out of the camera, the pressure plate will engage the edges of camera objective aperture 36 and slot 37, clamping the portion of the supply film threaded over the front face of the pressure plate therebetween so that no light can enter the interior of the magazine beyond the clamped portion of the supply film, some three frames as shown. Thus while the clamped portion of film is fogged and not further useful for picture taking, the balance of supply roll 21 is shielded against light.

At the forward region of cover 7, positioned the nearer to objective apertured end wall 5 when the magazine is closed, its lower face supports one end of a justifying spring 41 of which the front free end overlaps and bears against the adjacent end of pressure plate 35. Region 42 of the inner face of magazine bottom 2 adjacent to objective apertured end wall 5 is linear, hardened and highly polished, as are the regions 43 and 44 of the pressure plate aligned with the passing film, so that friction therebetween and the film is a minimum. Shoulder 45 at the forward end linear region 42 is substantially aligned with end surface portions 38 of the camera lens tube, being so designed that on assembly of the magazine to the camera body per se shoulder 47 of cover 7 is somewhat forward of aligned surfaces 38 and 45. Thus the free end of justifying spring 41, bearing on the adjacent film edge and on the adjacent end of the pressure plate, pushes both the film and the plate laterally toward linear region 42 of the inner face of magazine bottom 2 to register the film frames with the focal plane of the camera objective lens array. Also to reduce friction, both ends of pressure plate 35 are hardened and highly polished, the lateral forces transverse to the film being somewhat relieved after a frame is exposed in passing by the increase in distance between inner face 48 of the cover and the inner face 49 of bottom 2 by an inclined portion 50 following linear region 42. The lateral width dimension of pressure plate 35 is slightly less than the lateral width of the passing film, and, with the free end region of justifying spring 41 engaging the film edge as stated the nearer the magazine cover, such free end region being parallel to linear forward region 42 of magazine bottom 2, a small gap is maintained between both ends of the pressure plate and the free end region of spring 41 and magazine bottom 2, respectively.

Positioned near end wall 6, an arm 51 pivoted on stud 52 is spring biased such that its free end region tends to move toward take-up core 13 and shaft 14. Furthermore stud 52 is positioned to the same side of the longitudinal axis of my film magazine as are shafts 15, 16, 17 and 22, but opposite to that in which aperture 8 through the cover is located. At its free end region, arm 51 carries a vertically positioned permanent magnet 53 of horse-shoe shape of which the poles are uppermost and relatively of reduced cross-sectional area as compared to that of the body portions thereof. Obviously, as take-up roll 54 of the film increases in diameter about core 13, the free end of arm 51 will travel in an arcuate path against the tension of its spring bias similarly moving magnet 53 below the closely adjacent cover 7 thereabove. Magazine cover 7 has an arcuate groove 55 recessed in its outer face, registering with the arcuate path traversed by magnet 53 in accordance with the varying size of film take-up coil 54; groove 55 being of such width and cross-section as to maintain therein a small steel ball 56, which is correspondingly moved in the groove as the arm carrying the magnet is moved by the film roll winding about the take-up core. An appropriate scale 57 is provided along the groove, the position of the ball giving the footage, or percentage of the supply film roll, which has been exposed and wound on take-up core 13.

Also within the magazine interior, positioned longitudinally beyond shaft 17 in the direction toward end wall 6, a pair of mutually shielded light tubes 58 and 59 are disposed, extending from apertures through magazine bottom 2 with which bottom the outer end of each light tube is flush or slightly below the outer planar face of such bottom. The internal end of light tube 58 is substantially flush with roller bearing 19 on shaft 17, while that of light tube 59 is so disposed relative to roller bearing 18 on shaft 17; both internal ends being constricted to form substantially a point of light registering with the particular sprocket hole region of the passing film. The external ends of light tubes 58 and 59 are so positioned as to receive the individual light from a pair of pulse responsive light sources 60 and 61 in the camera body per se, each light source, like the light tubes of the magazine, being shielded from the other. If now electric pulses are applied to any or both of light sources 60 and 61 causing variations in the light emitted by the source or sources to which applied, with the magazine of the illustrative embodiment properly on the camera body, a record of these light variations will be made in sprocket perforation regions between successive perforations as the film advances within the magazine.

To thread film in the inventive magazine so that it will be supplied from a coreless film roll on exposure operation of the camera provided with my magazine until the entire length of film has been exposed and wound up on the take-up core, a coreless film roll 21 is positioned flat on the magazine bottom in the region thereof in front of rotatable shaft 14, having removed cover 7 and drawn a portion of the unexposed film from the roll to form a leader. This leading portion of the film is first threaded about the outermost (the nearer to wall 3) semi-circumferential portion of roller bearings 18 and 19 on shaft 15, then between the innermost portion (the top in FIG. 1) of sprocket 25 and the adjacent face (the bottom in said figure) of stripper 32 engaging the teeth of the sprocket to the registering film perforations, and about the outermost semi-circumferential portion of roller bearings 18 and 19 on shaft 16. Now the leading end of the film is threaded between pressure plate 35 and objective aperture 36 and claw slot 37 in front wall 5, then about the outermost semi-cylindrical portions of bearings 18 and 19 on shaft 15, positioning this second portion of the film leader outermost (below in FIG. 1) relative to the film leader portion already threaded thereabout, then about the inner half cylindrical portion of sprocket 25 and similarly outermost to the film portion already threaded thereabout—the second film leader portion likewise being below the first portion threaded thereabout—and about the adjacent quarter circular portion of bearings 18 and 19 of shaft 16 in similar position relative to the first film portion about the innermost semi-cylindrical portions of the last mentioned bearings. Now, however, the leading end region of the film is threaded about the outermost (lower in FIG. 1) semicylindrical portions of bearings 18 and 19 on shaft 17 and then clamped to take-up core 13 by split circular spring 31. As one result of this threading, coreless supply roll 21 on exposure operation of the camera supplies its film, the latter being advanced without any possibility of interference by the film snarling or tangling in that the supply roll 21 may freely move about in the magazine interior region otherwise unoccupied and cannot contact the teeth of sprocket 25 to damage the film in any way. By such freedom of movement of supply film roll 21, the latter readily absorbs all vibrations. The arrows in FIG. 1 indicate the direction in which the film is advanced when shaft 22 is coupled to the camera drive shaft and rotates also take-up core 13 through gears 26, 30 and 29 in the direction to wind exposed film thereon.

It will have been noted there are no projections whatsoever extending externally from the magazine of my invention. Without external projections it is obvious that the maximum number of my inventive magazines may be stored in a given space.

To attach my magazine operatively to a camera body, I provide a three-point suspension consisting of two front latching members 62 and 63 in objective apertured magazine wall 5 and a single rear latching means 64 in the adjoining portions of magazine bottom 2 and end wall 6, as also cover 7, compare FIG. 2, as follows: At about its midwidth, the external face of rear wall 6 is provided with a recessed groove 65 from the top to the bottom of the wall of a width snugly to receive a rod 66 of which the top has an enlarged top terminating in a knurled knob 67, the lower portion of rod 66 having a threaded portion 68 which is threaded into socket 69 pivoted on the camera body per se. Below socket 69 and spaced therefrom when rod 66 is tightened to hold the magazine on the camera body, rod 66 has preferably a nylon pin 70 extending therethrough and somewhat radially from it at both ends of the pin serving to act as a stop from completely unthreading the rod when rotating it in the direction to loosen the magazine from the camera body. Obviously pin 70 may be replaced by an enlarged disc or shoulder on the rod beyond the lower face of socket 69.

The camera body per se has a conical pad 71A at the central portion of its rearward region, the conical pad fitting a correspondingly negative conical recess 71B in the rear portion of the external surface of magazine bottom 2. The upper end face of the portion of groove 65 in magazine cover 7 has a dished portion 73 into which the bottom of knob 67 readily fits on rotation of rod 66 in the latching direction, and is appropriately inclined to center the magazine properly to position itself on conical pad 71A on the upper face of shoulder 74 of the camera body per se. It will be noted that conical pad 71A only supports the central portion of the rear region of the magazine above the upper face, the clearance thus provided to both lateral sides between the magazine and the camera body permitting a limited rocking motion of the magazine about its longitudinal axis supported on pad 71A at its rearward portion. The longitudinal location of pad 71A on the camera body and of the conical recess 71B in the magazine bottom thus determine the longitudinal axis of the magazine, as also the length of such axis in combination with the front latching means 62 and 63 as forthwith described.

Similar latching means 62 and 63 prevent any rocking movement of the properly positioned magazine about conical pad 71A when rod 66 of the rear latching means is tightened. As shown in FIG. 3, one front latching means is at the right end region of front magazine wall 5, the other at the left end region, in individual recesses 75 and 76 at about the midheight of the magazine. Each consists of a guide pin 77 adapted to enter an individual bore in registering lugs projecting from the camera body per se. Each guide pin 77 is substantially conical at its forward end, that is, bullet-shaped, and is supported in its associated bore, 75, 76, by a disc 78 at its remote end, the forward end of guide pins 77 being somewhat below (within) the external surface of magazine end wall 5. On properly positioning the magazine on the camera body, the associated projecting lugs of the body are inserted into the respective magazine recesses 75 and 76, guide pins 77 entering the bores provided for the pins in such lugs so that the ends of such lug bores are at a predetermined distance from the forward faces of discs 78, and both centering and tightening the magazine on the camera body as rod 66 of rear latching means 64, having been swung into groove 65, is rotated against dished portion 73, to lock the rear latching means. The centering action of the magazine on the camera body is conveniently aided by having the conical forward end of each pin 77 enter a corresponding conical recess in the center of the bottom of the pin receiving bores of such projecting lugs and rotating knob 67 tightly to engage dished portion 73, during which tightening the entire magazine tends to be pushed forwardly, tightly pressing pins 77 into their associated bores in the camera body projecting lugs and to position the faces of such lugs at the predetermined distance from the forward face of the associated disc 78. Thus prior to completely tightening knob 67 on dished portion 73, guide pins 77 entering the bores of the associated camera body projecting lugs, can readily rock the magazine positioned on conical pad 71A about the longitudinal axis as above described, and ultimately lock the same in position when knob 67 is finally tight against dished portion 73, on which locking the mutually perpendicular coordinates, perpendicular to said longitudinal axis, are determined and fixed by pins 77.

The embodiment of my inventive magazine herein described is solely by way of illustration and is in no way limitative of my invention which is defined in the claims.

What I claim is:

1. A film magazine for photographic cameras comprising: a closed housing, one wall of the housing including a camera objective aperture and a claw aperture longitudinally extending from the objective aperture for receiving a pull-down claw upon inserting the magazine in a camera, a pressure plate means within the housing adjacent said one wall thereof to bias film toward the objective aperture, a film take-up means within the housing, a film sprocket means within the housing, connecting means drivingly connecting the sprocket means to the film take-up means; a first roller means within the housing positioned on one side of the sprocket means, a second roller means positioned within the housing on the other side of the sprocket means, a third roller means positioned within the housing on the side of the second roller means opposite the side of the second roller means near the sprocket means, a film stripper means within the housing preventing a roll of film within the housing from contacting the film sproket means; a freely placed film roll in the housing; the interior of the housing being free of a film supply means, film being threaded from the film roll around the first roller means to the second roller means engaging the sprocket means, from the second roller means between the pressure plate means and the objective aperture to the first roller means, from the first roller means to the second roller means engaging the sprocket means, from the second roller means to the third roller means and from the third roller means to the film take-up means in a direction whereby all adjacent faces of the film in the film path move in the same direction and at a substantially equal velocity.

2. The magazine as defined in claim 1 and further comprising a spring means bearing against one edge of film passing between the pressure plate and the objective aperture, said spring means keeping the film precisely at the focal plane of the objective.

3. The magazine of claim 1 and further comprising: a hollow boss extending into the interior of the housing from another wall thereof; a shaft rotatably mounted within the boss and extending therethrough into the interior of the housing, the end of the shaft adjacent the another wall including a connection means for connecting the shaft to the drive means of a camera; and a shell mounted on the interior end of said shaft and rotated thereby, said shell containing the film sprocket means.

4. The magazine of claim 3 wherein the another wall includes a first, second and third recess on the interior portion thereof, and the connecting means drivingly connecting the sprocket means to the film take-up means comprises a first gear means connected to the shaft and positioned in said first recess; a third gear means connected to the film take-up means and positioned in the third recess; and a second gear means in the second recess, said second gear means engaging said first and third gear means, the clearances between the gear means and the recesses being maintained at a minimum whereby edge portions of film in the magazine are maintained free of the gear means.

5. The magazine of claim 1 wherein the exterior of said one wall of the housing contains a first and second recess at opposite ends thereof and further comprising pin means positioned in the first and second recesses to register with corresponding bores in a camera body; the exterior portion of the bottom well of the magazine including a third recess at an intermediate portion of the end thereof, opposite said one wall, said third recess having an axis which is perpendicular to the axes of the pin means and adapted to register with a corresponding pad on a camera extending into the third recess whereby upon placing the magazine in the camera the magazine is supported by a three-point suspension system, without the magazine having any external projections for effecting support thereof.

6. The magazine of claim 5 wherein the housing is a rectangular parallelepipe.

7. The magazine of claim 6 wherein the wall of the magazine opposite said one wall contains a groove which is in axial alignment with said third recess, said groove adapted to receive a rod for maintaining the magazine supported on the camera.

8. The magazine of claim 1 and further comprising an arm means pivotally mounted within the housing adjacent said film take-up means, the free end of the arm means being biased toward said film take-up means whereby the addition of film to the film take-up means moves said arm means, a magnet mounted on the arm means; the exterior of the housing containing a groove extending over the path over which the arm means moves, a magnet responsive indicating means in the groove, said indicating means being moved by the magnet on the arm means to indicate the amount of film wound on the film take-up means.

9. The magazine of claim 1 and further comprising a light conductive rod within the magazine having one end aligned with at least one of said roller means at the portion of the roller which engages the sprocket hole region of the film, said other end of the rod being positioned at the external surface of the magazine to be registerable with a light source in a camera.

10. The film magazine as defined in claim 1 wherein said camera objective aperture in one wall of the housing is of a size and shape to telescopically receive the end surface of a camera lens tube which is the embodiment of the focal plane of the camera, whereby upon inserting the magazine in a camera the end surface of the camera lens tube abuts against film at the objective frame aperture.

11. A film magazine for photographic cameras comprising: a housing comprised of a pair of end walls, a pair of side walls and a bottom wall, a removable light-tight cover removably connected to the end walls and side walls to seal the housing, the exterior of said housing and said cover being free of external projections, one of said end walls including a camera objective aperture and a claw aperture longitudinally extending from the objective aperture for receiving a pull-down claw upon inserting the magazine in a camera; a film take-up means within the housing mounted on the bottom wall thereof, said film take-up means including a first gear means positioned in a first recess in the bottom wall of the housing; a film sprocket means with the housing mounted on the bottom wall of the housing adjacent one of said side walls, said sprocket means including a second gear means positioned in a second recess in the bottom wall of the housing and a connection means for drivingly connecting the film sprocket means to the drive means of a camera; a first roller means within the housing mounted on the bottom wall thereof adjacent said one side wall between the sprocket means and said one end wall; a second roller means within the housing mounted on the bottom wall thereof adjacent said one side wall between the sprocket means and the other end wall; a third roller means within the housing mounted on the bottom wall thereof adjacent said one side wall between the second roller means and the other end wall; a film stripper means within the housing extending around the circumferential portion of the film sprocket means opposite the one side wall; the ends of the film stripper means being connected to the first and second roller means; a pressure plate means within the housing adjacent said one end wall to bias film toward the objective aperture; a spring means connected to the interior of the cover adjacent said pressure plate means, said spring means bearing against the upper edge of film passing between the pressure plate means and the objective aperture, said spring means urging the film toward the bottom wall of the housing and keeping film frames at the focal plane of the objective; a third gear means positioned in a third recess in the bottom wall of the housing, the third gear means engaging the first and second gear means whereby the sprocket means is drivingly engaged to the film take-up means, the interior of the housing being free of a film supply means, said first, second and third roller means, said film take-up means and said film sprocket means moving film at a substantially constant velocity upon inserting a freely placed film roll in the housing from the roll to the first roller means, from the first roller means to the second roller means engaging the sprocket means, from the second roller means between the pressure plate means and the objective aperture to the first roller means, from the first roller means to the second roller means engaging the sprocket means, from the second roller means to the third roller means and from the third roller means to the film tak-up means in a direction whereby all adjacent faces of the film in the film path move in the same direction.

12. The magazine of claim 11 wherein the exterior of the one of said end walls contains a fourth and fifth recess at opposite ends thereof and further comprising pin means positioned in the fourth and fifth recesses having their axes parallel to the bottom wall of the housing; the exterior of said bottom wall at an intermediate portion adjacent the intersection thereof with the other end wall including a sixth recess having its axis perpendicular to the axes of the pin means whereby the magazine is supported on a camera by a three-point suspension system comprising the pin means inserted in corresponding bores in the camera and a pad on the camera inserted into the sixth recess without the magazine containing any external projections for effecting support thereof.

13. The magazine of claim 12 wherein the housing is a rectangular parallelepipe and the other end wall contains a groove in axial alignment with the sixth recess, said groove adapted to receive a rod for maintaining the magazine supported on the camera.

References Cited
UNITED STATES PATENTS 2,228,855   1/1941   Sperry _____ 352—224

NORTON ANSHER, Primary Examiner

M. H. HAYES, Assistant Examiner